United States Patent [19]
Barringer et al.

[11] Patent Number: 5,530,546
[45] Date of Patent: Jun. 25, 1996

[54] METHOD AND APPARATUS FOR TESTING FIBER OPTIC JUMPERS

[75] Inventors: Wayne A. Barringer, Boca Raton, Fla.; Casimer M. DeCusatis, Jr., Poughkeepsie, N.Y.; Christopher M. Fleck, Boca Raton, Fla.

[73] Assignee: International Business Machines Corporation, Armonk, N.Y.

[21] Appl. No.: 494,856

[22] Filed: Jun. 26, 1995

[51] Int. Cl.⁶ ................................................ G01N 21/84
[52] U.S. Cl. .................................................. 356/73.1
[58] Field of Search ..................................... 356/73.1

[56] References Cited

U.S. PATENT DOCUMENTS

| | | | |
|---|---|---|---|
| 4,309,105 | 6/1982 | Lebduska | 356/73.1 |
| 5,093,568 | 3/1992 | Maycock | 250/227.14 |
| 5,179,420 | 1/1993 | So et al. | 356/73.1 |
| 5,196,899 | 3/1993 | Serwatka | 356/73.1 |

Primary Examiner—Vincent P. McGraw
Attorney, Agent, or Firm—Richard A. Tomlin; Ronald V. Davidge

[57] ABSTRACT

A station for testing fiber optic jumper cables includes four indexing plugboard stations. A single cable to be tested is typically attached to extend between two of the plugboard stations. Each plugboard station includes three columns of plug positions, corresponding to three styles of connecters which may be used at the ends of the cable to be tested. An upper row, and a central row, of plug positions correspond to the contact types (PC or APC) which may be used. An indexing mechanism is provided to align one of the plug positions in the central row with a reference cable extending from the plugboard station. Reference jumpers extend from the upper row, being docked in a lower row of plug positions if the cable to be tested is connected to the central row, or being plugged into the central row if the cable to be tested is connected to the upper row. The reference cable extending from each of the plugboard stations is brought into and out of contact with one of the central-row plugboard positions, facilitating a sequence of tests. The reference cables from two of these plugboard stations are connected through an optical switch to an optical time domain reflectometer (OTDR), while the other two reference cables are simply connected to connectors at their far ends. A computer controls indexing the plugboard stations and brings the reference cables into engagement according to a preferred sequence.

21 Claims, 3 Drawing Sheets

METHOD AND APPARATUS FOR TESTING FIBER OPTIC JUMPERS

BACKGROUND OF THE INVENTION

1. Field of the Invention

This invention relates to apparatus for testing fiber optic jumpers, and, more particularly, to apparatus for facilitating the testing of fiber jumpers having various types, and combinations of types, of connectors at both ends.

2. Background Information

A fiber optic jumper consists of an optical fiber having a connector at each end for mating with a suitable connector forming part of another cable or device. The jumper may have two identical connectors, or the types of connectors may be different, as required by the intended application of the jumper. The testing of a single mode fiber optic jumper requires both insertion loss and return loss measurements on both connectors. These measurements are two distinct tests, with unique setups to be repeated for both connector ends. Conventional return loss measurements for jumpers manufactured with most common bulk optical fiber cable materials generally require the application and subsequent removal of an index-matching gel on the connector endfaces, in operations which are both difficult and time consuming.

With conventional methods, the test setup is reconfigured each time a new connector type is to be tested. The reconfiguration is a manual process requiring a mechanical changeover, together with the measurement of certain reference values. For example, connectors may be of PC (physical contact) or APC (angle physical contact) contact types. Also, both the PC and APC contact types are used in SC, ST, and FC connector styles. Changing from one contact type to another, or changing from one connector style to another requires the use of different reference jumpers and/or adapters.

Conventional insertion and return loss measurement techniques take about three or four minutes per jumper, and are prone to error. What is needed is a method to speed up such measurements, to reduce errors and reliance on skilled operators through automation, and to facilitate changes between physical contact types and connector styles.

DESCRIPTION OF THE PRIOR ART

U.S. Pat. No. 4,309,105 to Lebduska describes apparatus for testing a fiber optic cable by comparing its optical transmission level with that of a known acceptance cable. Stability of the test process is achieved by using a variable, calibrated power source. The accuracy of the method is achieved by simultaneously coupling light from a common optical source into both a cable forming part of the apparatus and the fiber optic cable being tested. This arrangement keeps amplitude drift of the optical source and the apparatus detector from affecting the validity of subsequent relative measurements of the optical outputs.

While Lebduska addresses the problems of speeding the test process when a large number of cables having the same contact type and connector style are to be tested, with types of tests being described together with means for assuring their accuracy, the problem of changing among contact types and connector styles is not addressed.

U.S. Pat. No. 5,179,420 to So et al. describes an optical time domain reflectometer (OTDR), in which an optical signal is coupled to an optical fiber path to be tested, and in which back-scattered and reflected light from the optical fiber path is detected and used to determine loss-distance characteristics of the path. A control unit varies the wavelength of the optical signal by varying the temperature of the semiconductor laser constituting the optical source, so that the loss-distance characteristics for a plurality of different wavelengths are determined and can be displayed to show any wavelength-dependent loss of the optical fiber path. Such a loss may be due to modal interference associated with closely-spaced discontinuities in the path.

Thus, while So et al. discuss particular improvements to an OTDR, along with the methods of its use, the problem of arranging attachment of such a device to different connection systems is not addressed.

U.S. Pat. No. 5,093,568 to Maycock describes a monitoring system which continuously monitors fiber optic cables for faults, and which then enable automatic location of the fault in the cable. In the system, an optical signal is generated and connected as an output signal to a first end of the fiber optic cable for transmission to a second end. The signal is then returned through the fiber optic cable to provide a return signal at the first end of the cable. A comparator at the first end compares the output signal and the return signal and provides corresponding difference data. An OTDR (optical time domain reflectometer) detects the location of a signal loss along the fiber optic cable, and a data processing system determines the location of the signal loss from the corresponding difference data. A single optical time domain reflectometer can be used for monitoring a plurality of fiber optic cables.

Since the apparatus of Maycock is typically attached permanently to a number of fiber optic cables for continuous monitoring, a need to change from one type of connection to another does not exist and is not addressed.

For the application of testing fiber optic jumper cables, what is still needed is a means for quickly changing from one contact type to another and from one contact style to another, along with a means for facilitating the application of various types of tests.

SUMMARY OF THE INVENTION

In accordance with one aspect of the invention, there is provided an indexing plugboard station for engaging a first connector of an external elongated member with an internal elongated member. This first connector has first and second attributes, with the first attribute being one of a number of first attribute types, and with the second attribute being one of a number of second attribute types. The indexing plugboard station includes a plugboard, a number of jumper elongated members, an engagement mechanism, and an indexing mechanism. The plugboard includes an array of plug positions extending in a first common direction for engaging the first connector. The array of plug positions is divided into a number of columns, with plug positions within each of the columns engaging a connector having a common first attribute. The array of plug positions also includes a first row of plug positions having a first of the second attribute types, a second row of plug positions engaging a connector having a second of the second attribute types, and a third row of plug positions docking a connector having the second of the second attribute types. Each of the jumper elongated members has a near end engaging a plug position within the first row of plug positions, and each of the jumper elongated members extends from the plugboard opposite the common first direction. Each of the jumper elongated members has a far end for engaging plug positions within the second and third rows of plug positions. The engagement mechanism holds a near end of the internal elongated member, moving this near end into and out of engagement with a plug position within the second row of plug positions. The indexing mechanism aligns the near end of the internal elongated member with each plug position within the second row of plug positions.

This aspect of the present invention facilitates the attachment of an elongated member to a device when the elongated memory has one of a number of different types of connector. Conventional methods and prior art methods do not address this need. In the above paragraph, the members to be attached are described as elongated members, since this aspect of the present invention may be applied, for example, to electrical cables having different cables, or even to hydraulic or pneumatic lines. For the preferred embodiment of the present invention, the elongated members are fiber optic cables, the first attribute is the body style of the connector, whether it is a screw type, a quarter-turn fastener type, or a push to connect or disconnect type; and the second attribute is the contact type, whether it is a physical contact type or an angled physical contact type. While the designation of "rows" and "columns" are used to indicate horizontal and vertical portions, respectively, of an array within the preferred embodiment, these designations are not intended to limit the scope of the invention. That is, the "columns" described herein may be placed horizontally or vertically. Also in the preferred embodiment, the "internal elongated member" is a fiber optic cable extending within the test equipment, while the "external elongated member" is the cable to be tested, which extends outside the test equipment.

In accordance with another aspect of the invention, a testing station is provided for testing a fiber optic jumper having a first connector at a first end and a second connector at a second end. The testing station includes an inspection device, first and second connection stations, and control means. The inspection device, which is connected to a far end of a first reference fiber optic cable system, generates optical signals sent outward along the first reference fiber optic cable system and analyzes reflected optical signals returning inward along this cable system. The first connection station, which is for removably connecting the first connector of the jumper to be tested, includes a first engagement mechanism for bringing a first tip portion of a near end of the first reference fiber optic cable system into engagement with a first optical path extending into the jumper under test through the first connector. The second connection station, which is for removably connecting the second connector of the jumper to be tested, includes a second engagement mechanism for bringing a second tip portion of a near end of a second reference fiber optic cable into engagement with a second optical path extending into the jumper under test through the second connector.

DETAILED DESCRIPTION

Figure 1:
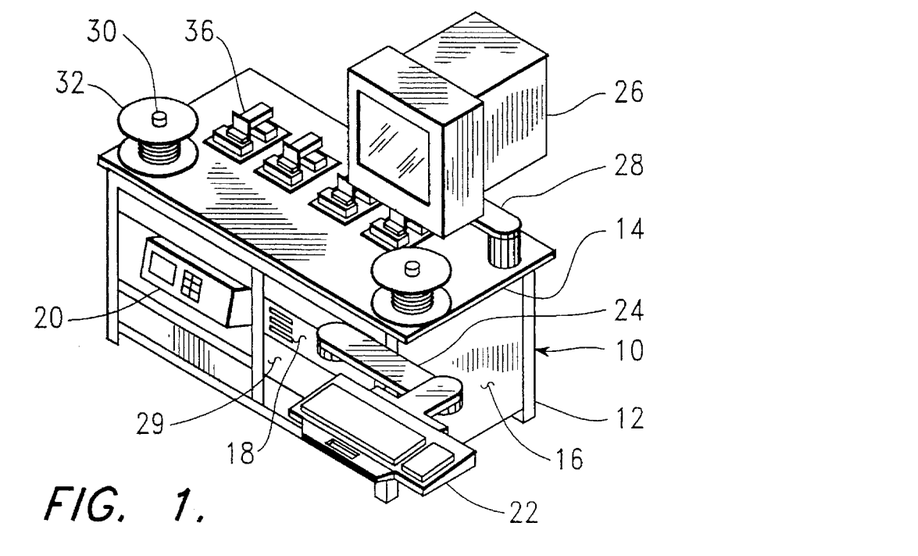
FIG. 1 is an isometric view of a testing station built in accordance with the present invention.

FIG. 1 is an isometric view of a testing station built in accordance with a preferred embodiment of the present invention. This testing station 10 includes a table structure 12 with a table top 14 and a cabinet structure 16 housing a rack-mounted personal computer 18 and an OTDR 20 (optical time domain reflectometer). A keyboard 22, movably mounted to cabinet structure 16 by means of an adjustable pivot arm 24, and a display unit 26, movably mounted to table top 14 by means of an adjustable pivot arm 28, are electrically connected to the personal computer 18 to provide typical input and output functions within a computing system. A DIDO (Digital In, Digital Out)logic unit 29 within cabinet structure 16 provides an interface between a port established at an adapter card in the personal computer 18 and a number of input and output signals from other parts of the testing station. The testing station 10 also includes, extending upward from table top 14, two posts 30, each of which provides a location for the placement of a reel 32, on which a fiber optic jumper 34 under test is wound. Four indexing plugboard stations 36 extend in a row along the center of table top 14.

Figure 2:
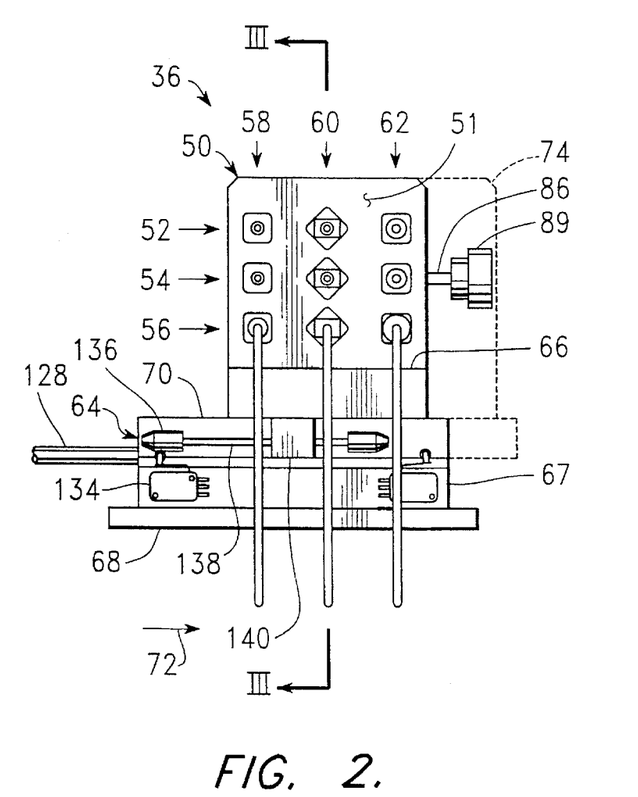
FIG. 2 is a front elevational view of an indexing plugboard station for the attachment of jumpers to be tested in the testing station of FIG. 1.
Figure 3:
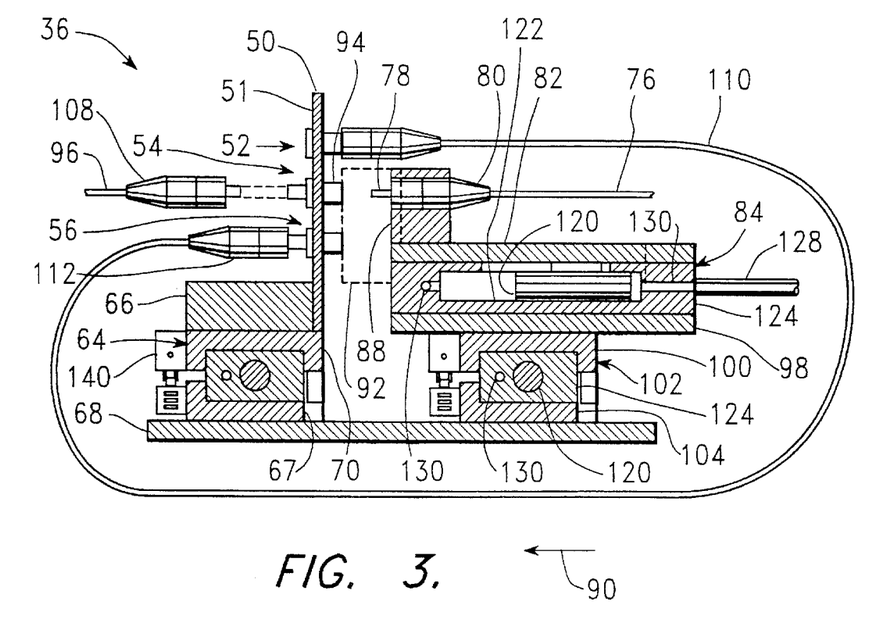
FIG. 3 is a vertical cross-sectional view of the indexing plugboard station of FIG. 2, taken as indicated by section lines III—III in FIG. 2, shown with jumpers in positions for the attachment of PC connectors.
Figure 4:
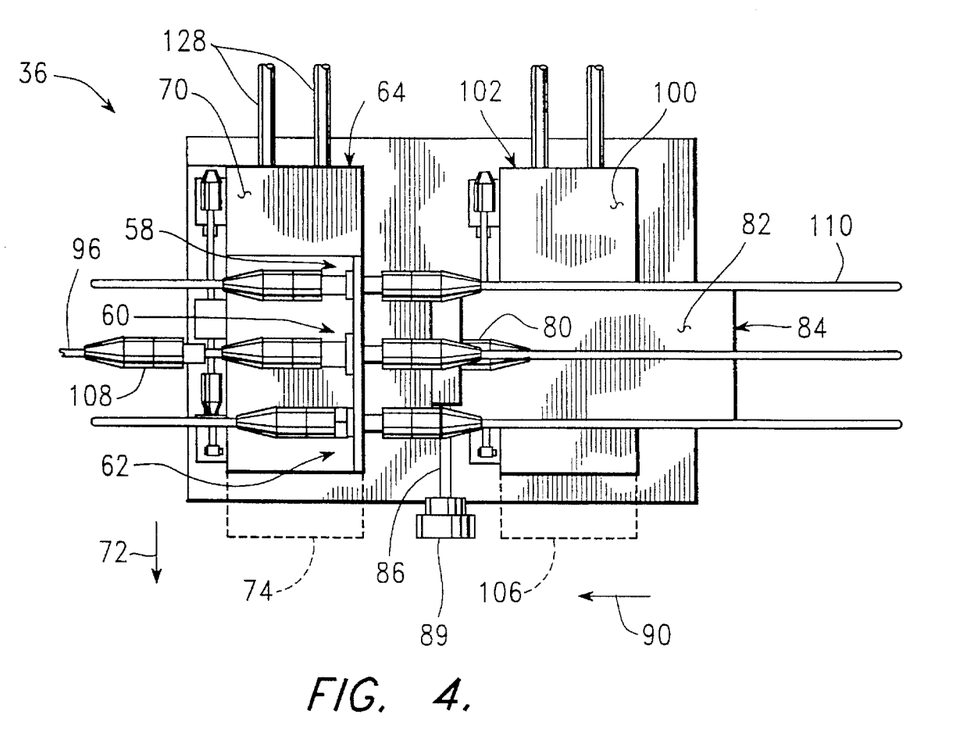
FIG. 4 is a plan view of the indexing plugboard station of FIG. 3.

The indexing plugboard stations 36 will now be discussed with particular reference to FIGS. 2, 3, and 4, which are views of an indexing plugboard station for the attachment of jumpers to be tested in the testing station of FIG. 1. FIG. 2 is a front elevational view; FIG. 3 is a vertical cross-sectional view, taken as indicated by section lines III—III in FIG. 2; and FIG. 4 is a plan view. FIGS. 3 and 4, show the indexing plugboard station with jumpers in position for the attachment of PC connectors.

Referring first to FIG. 2, each indexing plugboard station 36 includes a plugboard 50 having plug positions extending outward from a front plugboard surface 51 and being divided into rows according to contact types. An upper row 52 of plug positions has APC (angled physical contact) connectors; a central row 54 of plug positions has PC (physical contact) connectors, and a lower row 56 provides docking positions. The rows 52, 54, and 56 are divided into columns according to connector styles, with a left column 58 having ST connectors with slotted cylindrical bodies for engagement with a "quarter-turn," a central column 60 having SC connectors with rectangular bodies for "push-push" engagement and disengagement, and a right column 62 having FC connectors with threaded bodies for screw engagement. The plugboard 50 is mounted to a first pneumatically actuated slider block 64 by means of a mounting block 66. Slider block 64 includes a base channel 67, which is fastened to table top 14 (shown in FIG. 1) by means of a base plate 68, and an upper channel 70, which moves with the plugboard 50 in and opposite to the direction indicated by arrow 72, between a left position, in which these parts are shown, and a right position indicated by dashed lines 74.

Referring to FIGS. 2 and 3, further provisions are made for the selective attachment of each plug position in central row 54 to a reference cable 76 extending rearward from the plugboard 50. This reference cable 76 has an ceramic end portion 78 configured according to the PC contact type. The connector body 80 of reference cable 76 is clamped to a sliding channel 82 of a second pneumatically actuated slider 84 by means of a clamping screw 86 engaging a connector mounting block 88. An attached knob 89 is provided to allow the loosening and tightening of clamping screw 86. Sliding channel 82 moves with mounting block 88, in and opposite to, the direction of arrow 90, between a disengaged position, in which these parts are shown, and an engaged position indicated by dashed lines 92. When connector mounting block 88 is in the disengaged position, the connector bodies 94 extending rearward from the central row 54 of plug positions can be moved past the ceramic end portion 78 of reference cable 76. When the connector mounting block 88 is in the engaged position, a connection is made with a fiber optic cable 96 attached to the plug position, in central row 54, which is in alignment with ceramic end portion 78. The base channel 98 of second slider 84 is attached to a sliding channel 100 of a third pneumatically actuated slider 102, having a base channel 104 which is in turn fastened to base plate 68.

Referring to FIGS. 3 and 4, sliding channel 100 of third slider 102 moves in and opposite to the direction of arrow 72, between the left position in which it is shown and a right position indicated by dashed lines 106. The distance through which sliding channel 100 moves is equal to the distance through which sliding channel 72 moves and to the distance between the centers of adjacent plug position columns 58 and 60, or 60 and 62. Thus, when both sliding channels 70 and 100 are in their left positions, or when both sliding channels 70 and 100 are in their right positions, the ceramic end portion 78 extending from connector body 80 of reference cable 76, is aligned with the plug position in central row 54 and central column 60. Under these conditions, a fiber optic cable 96 to be tested, having a connector 108 with a PC type contact and an SC connector style is attached to the plug position in central row 54 and central column 60. When sliding channel 70 is in its right position, as indicated by dashed lines 74, while sliding channel 100 is in its left position, the ceramic end portion 78 is aligned with the plug position in central row 54 and left column 58. Under these conditions, a fiber optic cable (not shown) to be tested, having a connector with a PC type contact and an ST connector style is attached to the plug position in central row 54 and left column 58. When sliding channel 70 is in its left position, while sliding channel 100 is in its right position, as indicated by dashed lines 106, a fiber optic cable (not shown) to be tested, having a connector with a PC type contact and an FC connector style, is attached to the plug position in central row and right column 62.

Thus, when a determination is made that a connector having a specific style (SC, ST, or FC) is to be attached to the plugboard 50 for testing the fiber optic cable of which the connector is a part, the plugboard 50 and reference cable mounting block 88 are moved as needed by the actuation of sliders 64 and 102. Before such movement is accomplished, if ceramic end portion 78 is engaged, with mounting block 88 in the position indicated by dashed lines 92, this end portion is disengaged by moving sliding channel 82 opposite the direction of arrow 90, into the position in which it is shown. Before an attached cable is tested, if ceramic end portion 78 is disengaged, in the position shown, the mounting block is moved into the position indicated by dashed lines 92, with sliding channel 82 moving in the direction of arrow 90.

Figure 5:
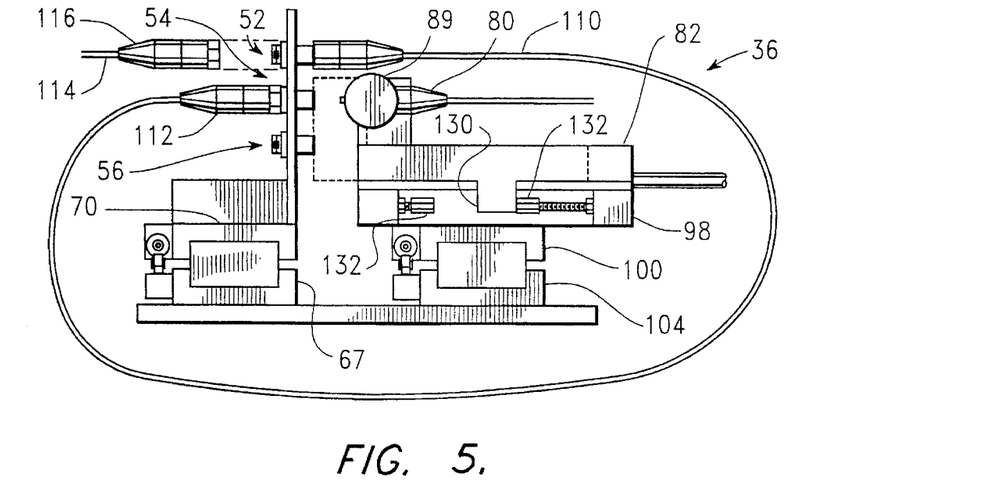
FIG. 5 is a right elevational view of the indexing plugboard station of FIG. 2, shown with jumpers in positions for the attachment of APC connectors.

FIG. 5 is a right elevational view of the indexing plugboard station 36 with jumpers attached to facilitate the testing of fiber optic cables having APC contact type connectors. As previously discussed in reference to FIGS. 2–4, the upper row 52 of plug positions on plugboard 50 is configured for the attachment of fiber optic cables having APC contact type connectors. A reference jumper cable 110 extends rearward from each of the plug positions in upper row 52, having a connector 112 to be connected to an associated docking position in lower row 56, as shown in FIGS. 3 and 4, or alternately to be connected to an associated plug position in central row 54, as shown in FIG. 5. While the reference cables 110 are shown as being relatively short, they may be as long as 9 meters to optimize optical performance.

Referring to FIG. 5, when a reference cable connector 112 is plugged into a position in the central row 54, a test cable 114 having an APC contact type connector 116 is plugged into a plug position in upper row 52. The determination between the three plug positions in this row 52 is made as described above. If the test cable has an ST style connector, it is plugged into left column 58; if it has an SC style connector, it is plugged into central column 60; if it has an FC style connector, it is plugged into right column 62.

Depending on the testing application, when it is determined that a different contact type is to be tested, one or all three reference cable connectors 112 may be moved. For example, if only SC type connectors having the new contact type are to be tested, it may be easier to move only the SC type connector 112.

The three pneumatically-actuated sliders 64, 84, and 102 have a number of features formed using common parts, which are identified herein using common reference numerals. Pneumatically-actuated sliders of this type may be purchased from THK Co., Ltd., Tokyo, Japan, under the name "Ball Slide Equipped with Pneumatic Cylinder Type LSC."

Referring again to FIG. 3, each sliding channel 64, 84, or 102 includes a piston 120 slidably mounted in a cylinder chamber 122 within a block 124. The block 124 is mounted to a base channel 67, 98, or 104. The piston 120 is attached to the sliding channel 70, 82, or 100. Each end of the cylinder chamber 122 is ported to one of the pneumatic lines 128 attached at one end of the block 124, by means of internal channels 130 within the block 124. The piston 120 is moved toward an end of the cylinder chamber 122 by exhausting the line 128 to which the cylinder is ported at the end to which such motion is to occur, and by applying air pressure to the other line, which is ported to the opposite end of the cylinder chamber. The sliding channel 70, 82, or 100 moves with the associated piston 120.

Referring again to FIG. 5, limits of the motion to be provided by each sliding channel 70, 100, or 82 is established by contact between a tab 130 extending downward from the sliding channel and a pair of stops 132 adjustably mounted on the base channel 67, 98, or 104.

Referring again to FIG. 2, the motion of each sliding channel, such as sliding channel 70, is detected using a pair of limit switches 134. As an end of a sliding movement is approached in either direction, the limit switch 134 toward which motion is occurring is operated by a switch actuator 136, which is adjustably mounted on a shaft 138 clamped to the sliding channel (in this case, sliding channel 70) by means of an outward extending tab 140.

Thus, fiber optic jumpers having any combination of two attributes may be attached to the plugboard 50. The first of these attributes is the contact type, APC or PC, while the second of these attributes is the connector style—SC, ST, or FC. While these attributes have been chosen to handle the kinds of jumpers currently available and needing this type of testing, the concepts of plugboard 50 can be readily expanded to handle additional contact types and connector styles. For example, another connector style can be accommodated by including another column of plug positions, together with another position at which the indexing motion is stopped. Another contact type can be accommodated by including an additional row of plug positions, together with an additional set of reference jumpers and docking positions.

Figure 6:
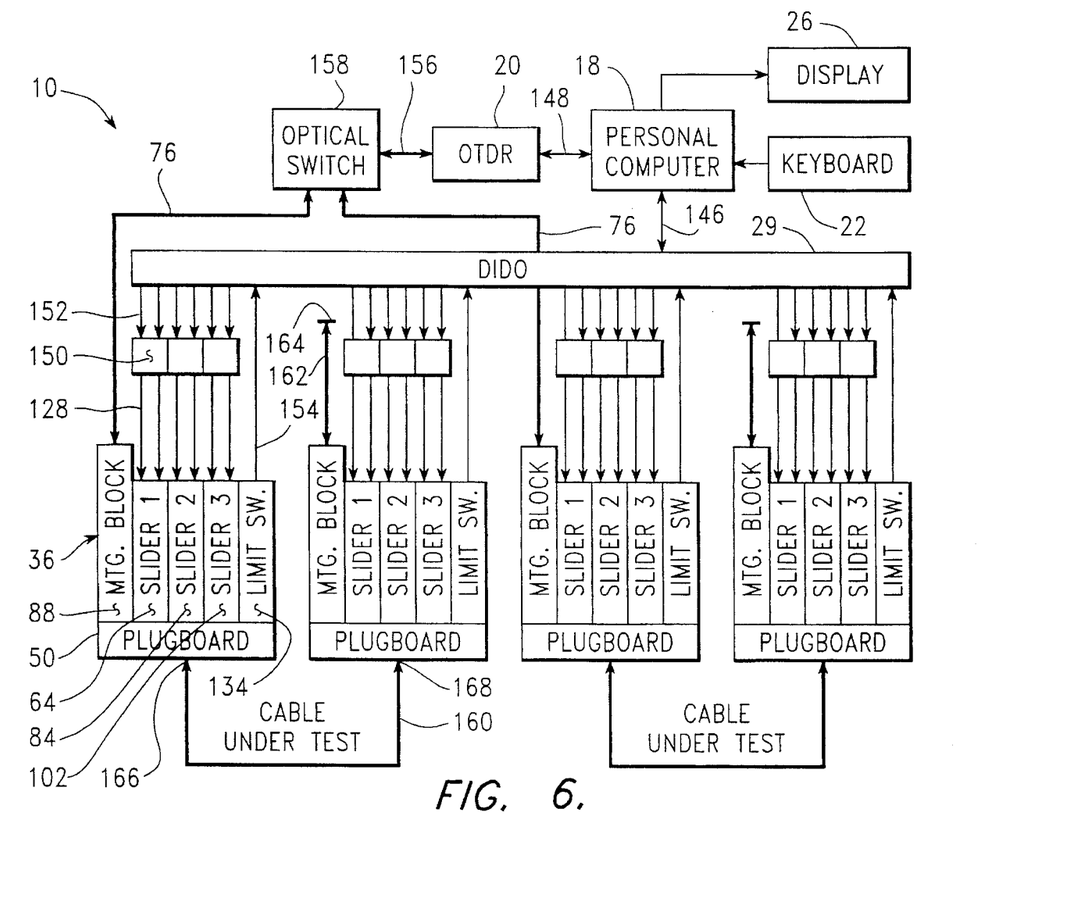
FIG. 6 is a schematic view of the testing station of FIG. 1.

FIG. 6 is a schematic view of the testing station 10 of FIG. 1, showing particularly various connections among the major elements, such as personal computer 18, OTDR (Optical Time Domain Reflectometer) unit 20, DIDO (Digital In, Digital Out) logic 29, and the four indexing plugboard stations 36. Reference numerals previously applied to various of the elements in FIGS. 1–5 are also applied to the schematic symbols for these elements in FIG. 6.

Referring to FIG. 6, a port within personal computer 18 is connected to DIDO logic 29 through a cable 146. This interface may be accomplished, for example, using an adapter card in the computer 18 and software available from OPTO 22 of Temecula, Calif., under the name PAMUX. Personal computer 18 is also connected to OTDR unit 20 through a cable 148. The GPIB interface may be used for this connection, using an adapter card in the computer 18 available from National Instruments of Austin, Tex.

As previously described in reference to FIGS. 2–5, each indexing plugboard station 36 includes pneumatically-actuated sliders 64, 84, and 102. Each of these sliders is connected to a solenoid valve 150 by means of a pair of pneumatic lines 128. Each solenoid valve is electrically operated by signals sent along lines 152 from DIDO logic 29. Each solenoid valve 150 is preferably of a commercially-available type having two positions, the first of which provides pressure to a first attached line while exhausting a second attached line, and the second of which provides pressure to the second attached line while exhausting the first attached line. Thus, when the solenoid valve is in a first position, the associated sliding channel 70, 98, or 104 (shown in FIG. 3) is moved to, and held at, a first end of its motion by air pressure. When the solenoid valve is in a second position, the associated sliding channel 70, 98, or 104 is moved to, and held at, an end of its motion opposite the first end. Each solenoid valve 150 preferably also includes a toggle mechanism (not shown) holding the valve mechanism (also not shown), within the valve 150, at either its first or second position, so that the movement of the associated sliding channel 70, 98, or 104 in either direction can be accomplished with a relatively short electrical pulse. After the application of such a pulse, the toggle mechanism within the valve 150 holds the valve mechanism in place, and the continued application of air pressure through the valve 150 holds the associated sliding channel 70, 98, or 104 in place. The application of another electrical pulse to the valve 150 is not required until it is necessary to move the associated sliding channel 70, 98, or 104 again.

The description of the preceding paragraph provides only a preferable example of solenoid valve operation; many other well-known, commercially-available types of solenoid valves may be used to provide the necessary flow of air into and out of the pneumatically-actuated sliders 64, 84, and 102, or these pneumatically-actuated devices may be readily replaced by, for example, electrical motors driving lead-screws.

As further described above in reference to FIG. 2, a pair of limit switches 134 provides indications of the position of the sliding channels of pneumatically-actuated sliders 64, 84, and 102. This information is returned to DIDO logic 29 by means of electrical lines 154.

The optical measurement system includes the OTDR unit 20, which may be a sub-millimeter OTDR obtained, for example, from Opto-Electronics, Inc., Oakville, Ontario, Canada as Model OFM 30SW Mainframe with an OM-1300SM9 Optical Module, together with associated reference jumpers connected to one or more of the indexing plugboard stations 36. In the example of FIG. 6, a first reference cable 156 extends between the OTDR unit 20 and a two-way optical switch 158, which connects the optical path from OTDR unit 20 to either of two reference cables 76, each of which is connected to the mounting block 88 of a different indexing plugboard station 36. Signals and reflections are transmitted from and to the OTDR unit 20 through this optical path. The first reference cable 156 may be a calibrated 2.5 percent reflectance launch cable typically supplied with OTDR unit 20. The various connections in this portion of the optical path are made, for example, with ST to ST connectors.

The fiber optic jumper cable under test 160 is typically connected to extend between two indexing plugboard stations 36. The type of connection to be made at each of the stations is determined by the connector at each end of the cable under test 160. The jumper cable 160 may have a different kind of connector at each end. For example, the cable 160 may have a PC connection at one end, being connected as cable 96 in FIGS. 3 and 4, and an APC connection at the other end, being connected as cable 114 in FIG. 5. If the cable under test is particularly long, it may be tested while wrapped on a reel 32 (shown in FIG. 1), with both ends exposed for attachment to the indexing plugboard stations 36. While the reference cable 76 providing a path to the OTDR unit 20 extends from the mounting block 88 of one of the plugboard stations 36 used to test a particular jumper 160, a terminal reference jumper 162, having only an ST connector 164 at its far end, is connected to the other plugboard station 36 used to test this jumper 160.

The jumper testing process is preferably carried out under the control of personal computer 18, which includes a data base describing the jumpers which may be tested, with their connector configurations at each end. The computer system 18 displays this menu on the screen of display unit 26, and the operator of the system selects the particular cable to be tested from the menu. This choice may be indicated by the operator by using the keyboard 22, by using a light-pen on the screen of display unit 26, by using a pointing device (not shown), such as a mouse, or by applying other conventional selection means. The personal computer 18 next determines whether it is necessary to index a plugboard station 36 to test the configuration chosen from the menu. The location of the pneumatically-actuated sliders before such indexing movement may be determined using the outputs of limit switches 134 through DIDO logic 29. If such movement is necessary, the computer 18 provides it, operating solenoid valves 150 through DIDO logic 29. Whenever indexing movement is required in one of the stations 36, the mounting block 88 of the station is first moved with pneumatically-actuated slider 84 to disengage the ceramic end 78 (as shown in FIG. 3) from the plugboard 50. This indexing movement may occur before or after the attachment of the cable under test to the appropriate plugboard positions.

The computer 18 also provides queues for the system operator, using the display unit 26 to tell him, for example, when the reference cables 110 should be moved from the positions in which they are shown in FIGS. 3 and 4, to the positions in which they are shown in FIG. 5, and telling him which plug positions should be used for the attachment of the cable under test.

After the cable under test 160 is connected to extend between two indexing plugboard stations 36, computer 18 performs insertion and return loss test procedures, using the sliders 84 to engage and disengage the ceramic end 78 (shown in FIG. 3) at each of the two plugboard stations 36 being used to test the cable. First, the OTDR unit 20 is used to determine the insertion loss and return loss of the first connector 166 of the cable under test 160. This first connector 166 is the connector which is attached to the same plugboard station 36 as reference jumper 76. This first testing is performed with the ceramic end 78 of cable 76, extending back to the OTDR unit 20 engaged, but with the ceramic end of terminal reference cable 162 disengaged. Next, the pneumatically-actuated slider 84 of the station 36 to which terminal reference cable 162 is attached is moved, so that the ceramic end of this cable 162 is engaged. With this configuration. OTDR unit 20 is used to determine the return loss and insertion loss of a second connector 168, which is attached to the plugboard unit 36 from which cable 162 extends.

The four indexing plugboard stations 36 provide two complete fixtures for cable testing, allowing measurements to be made in one such fixture, under computer control, while the operator disconnects and connects cables in the other station. The optical switch 158 directs the optical path to one of these fixtures or to the other.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for engaging a first connector of an external elongated member with an internal elongated member, wherein said first connector has first and second attributes, with said first attribute being one of a first plurality of first attribute types, and with said second attribute being one of a second plurality of second attribute types, wherein said apparatus comprises:

a plugboard including an array of plug positions for engaging said first connector, wherein said plug positions extend for engagement in a common first direction, wherein said array of plug positions is divided into a plurality of columns, with plug positions within each of said columns engaging a connector having a common first attribute, wherein said array of plug positions includes a first row of plug positions engaging a connector having a first of said second attribute types, a second row of plug positions engaging a connector having a second of said second attribute types, and a third row of plug positions docking a connector having said second of said second attribute types;

a plurality of jumper elongated members, wherein each said jumper elongated member has a near end engaging a plug position within said first row thereof, wherein each said jumper elongated member extends from said plugboard opposite said common first direction, and wherein each said jumper elongated member has a far end for engaging plug positions within said second and third rows of plug positions;

engagement means, holding a near end of said internal elongated member, for moving said near end of said internal elongated member into and out of engagement with a plug position within said second row of plug positions; and indexing means for aligning said near end of said internal elongated member with each plug position within said second row of plug positions.

2. The apparatus of claim 1:

wherein said engagement means moves said near end of said internal elongated member into engagement in said first common direction; and wherein said indexing means causes relative motion between said plugboard and said engagement means in an indexing direction perpendicular to said first common direction.

3. The apparatus of claim 2:

wherein said plugboard includes three columns of plug positions;

wherein centers of adjacent said columns of plug positions are separated in said indexing direction by a column separation distance; and wherein said indexing means includes first indexing means moving said plugboard between positions separated in said indexing direction by said column separation distance, and second indexing means moving said engagement means between positions separated in said indexing direction by said column separation distance.

4. Apparatus for engaging a first connector of an external fiber optic cable with a near end of an internal fiber optic cable, wherein said first connector has a contact type which is one of a first plurality of contact types, wherein said first connector has a connector style which is one of a second plurality of connector styles, and wherein said apparatus comprises:

a plugboard having an array of plug positions, wherein said plug positions extend for engagement in a common direction, wherein said array of plug positions is divided into a plurality of columns, with plug positions within each of said columns engaging a connector having a common said connector style, wherein said array of plug positions includes a first row engaging a first of said contact types, a second row engaging a connector having a second of said contact types and a third row of plug positions docking a connector having said second of said contact types;

a plurality of fiber optic jumpers, wherein each said fiber optic jumper has a near end engaging a plug position within said first row of plug positions, wherein each said fiber optic jumper extends from said plugboard opposite said common first direction, and wherein each said fiber optic jumper has a far end for engaging plug positions within said second and third rows of plug positions;

engagement means, holding a tip portion extending from said near end of an internal fiber optic cable, for moving said tip portion into and out of engagement with an optical path extending through a plug position within said second row of plug positions:

indexing means for aligning said tip portion with each plug position within said second row of plug positions.

5. The apparatus of claim 4:

wherein said engagement means moves said tip portion into engagement in said first common direction; and wherein said indexing means causes relative motion between said plugboard and said engagement means in an indexing direction perpendicular to said first common direction.

6. The apparatus of claim 5:

wherein said plugboard includes three columns of plug positions;

wherein centers of adjacent said columns of plug positions are separated in said indexing direction by a column separation distance; and wherein said indexing means includes first indexing means moving said plugboard between positions separated in said indexing direction by said column separation distance, and second indexing means moving said engagement means between positions separated in said indexing direction by said column separation distance.

7. Apparatus for testing a fiber optic jumper under test, wherein said fiber optic jumper under test has a first connector at a first end and a second connector at a second end, and wherein said apparatus comprises:

an inspection device connected to a far end of a first reference fiber optic cable system, wherein said inspection device generates optical signals sent outward along said first reference fiber optic cable system and analyzes reflected optical signals returning inward along said first reference fiber optic cable system;

a first connection station for removably connecting said first connector, wherein said first connection station includes first engagement means for bringing a first tip portion of a near end of said first reference fiber optic cable system into engagement with a first optical path extending into said fiber optic jumper under test through said first connector;

a second connection station for removably connecting said second connector, wherein said second connection station includes a second reference fiber optic cable system and second engagement means for bringing a second tip portion of a near end of said second reference fiber optic cable system into engagement with a second optical path extending into said fiber optic jumper under test through said second connector;

control means operating said first and second engagement means in a preferred sequence.

8. The apparatus of claim 7, wherein said preferred sequence includes the steps of:

holding said first tip portion in engagement with said first optical path while said second tip portion is held out of engagement with said second optical path;

performing a first test procedure through operation of said inspection device;

moving said second tip portion into engagement with said second optical path while said first tip portion is held in engagement with said first optical path; and performing a second test procedure through operation of said inspection device.

9. The apparatus of claim 7, wherein said inspection device is an optical time domain reflectometer.

10. The apparatus of claim 7, wherein said first connection station includes:

a first plugboard having an array of plug positions, wherein said plug positions extend for engagement in a first common direction, wherein said array of plug positions is divided into a plurality of columns, with plug positions within each of said columns engaging a connector having a common connector style, wherein said array of plug positions includes a first row engaging a first of said contact types, a second row engaging a connector having a second of said contact types and a third row of plug positions docking a connector having said second of said contact types;

a plurality of fiber optic jumpers, wherein each said fiber optic jumper has a near end engaging a plug position within said first row of plug positions, wherein each said fiber optic jumper extends from said first plugboard opposite said common first direction, and wherein each said fiber optic jumper has a far end for engaging plug positions within said second and third rows of plug positions; and first indexing means for aligning said first tip portion with each plug position within said second row of plug positions.

11. The apparatus of claim 10:

wherein said first engagement means moves said tip portion into engagement in said first common direction; and wherein said first indexing means causes relative motion between said first plugboard and said engagement means in a first indexing direction perpendicular to said first common direction.

12. The apparatus of claim 11:

wherein said first plugboard includes three columns of plug positions;

wherein centers of adjacent said columns of plug positions are separated in said first indexing direction by a column separation distance; and wherein said first indexing means includes first plugboard indexing means moving said first plugboard between positions separated in said first indexing direction by said column separation distance, and first engagement indexing means moving said engagement means between positions separated in said first indexing direction by said column separation distance.

13. The apparatus of claim 10, wherein said second connection station includes:

a second plugboard having an array of plug positions, wherein said plug positions extend for engagement in a second common direction, wherein said array of plug positions is divided into a plurality of columns, with plug positions within each of said columns engaging a connector having a common said connector style, wherein said array of plug positions includes a first row engaging a first of said contact types, a second row engaging a connector having a second of said contact types and a third row of plug positions docking a connector having said second of said contact types;

a plurality of fiber optic jumpers, wherein each said fiber optic jumper has a near end engaging a plug position within said first row of plug positions, wherein each said fiber optic jumper extends from said second plugboard opposite said common first direction, and wherein each said fiber optic jumper has a far end for engaging plug positions within said second and third rows of plug positions; and second indexing means for aligning said second tip portion with each plug position within said second row of plug positions.

14. The apparatus of claim 13:

wherein said second engagement means moves said tip portion into engagement in said second common direction; and wherein said second indexing means causes relative motion between said second plugboard and said engagement means in a second indexing direction perpendicular to said second common direction.

15. The apparatus of claim 14:

wherein said second plugboard includes three columns of plug positions;

wherein centers of adjacent said columns of plug positions are separated in said second indexing direction by a column separation distance; and wherein said second indexing means includes second indexing means moving said second plugboard between positions separated in said second indexing direction by said column separation distance, and second indexing means moving said engagement means between positions separated in said second indexing direction by said column separation distance.

16. The apparatus of claim 13, wherein said preferred sequence includes the steps of:

holding said first tip portion in engagement with said first optical path while said second tip portion is held out of engagement with said second optical path;

performing a first test procedure through operation of said inspection device;

moving said second tip portion into engagement with said second optical path while said first tip portion is held in engagement with said first optical path; and performing a second test procedure through operation of said inspection device.

17. The apparatus of claim 13, wherein said inspection device is an optical time domain reflectometer.

18. The apparatus of claim 13, wherein said control means operates said first and second index means.

19. The apparatus of claim 18:

wherein said control means stores a table of cable types, including contact types and connector styles of said cable types;

wherein said control means provides a display of said cable types; and wherein said control means, in response to selection of a certain cable type within said cable types, operates said first and second index means to facilitate connection of said fiber optic jumper under test according to connector styles stored within said table.

20. The apparatus of claim 19, wherein said preferred sequence includes the steps of:

holding said first tip portion in engagement with said first optical path while said second tip portion is held out of engagement with said second optical path;

performing a first test procedure through operation of said inspection device;

moving said second tip portion into engagement with said second optical path while said first tip portion is held in engagement with said first optical path; and performing a second test procedure through operation of said inspection device.

21. The apparatus of claim 7:

wherein said apparatus additionally comprises a third connection station for removably connecting a connector, wherein said third connection station includes third engagement means for bringing a third tip portion of a near end of said first reference fiber optic cable system into engagement with a third optical path extending into a second fiber optic jumper under test through a connector of said second fiber optic jumper under test; and wherein said first reference fiber optic cable system includes an optical switch connecting an optical path extending from said inspection with said first connection station and with said third connection station.

* * * * *